May 15, 1934.    F. H. LE JEUNE    1,959,081
CHUCK
Filed March 21, 1932    2 Sheets-Sheet 1
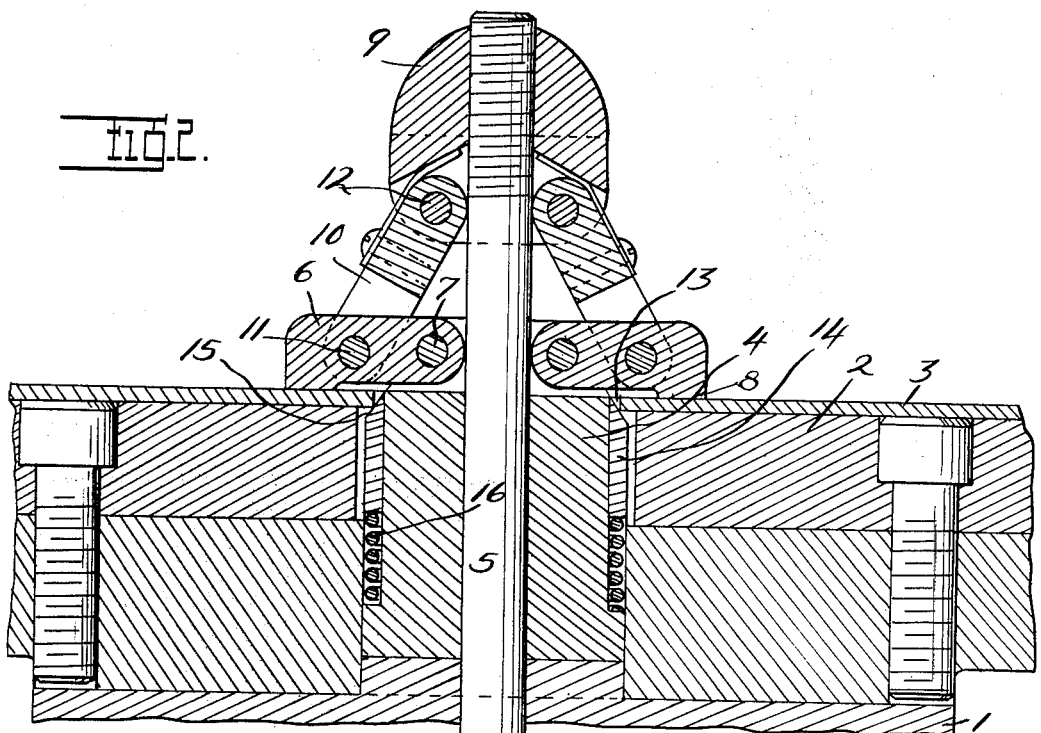
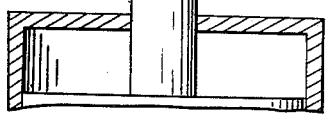
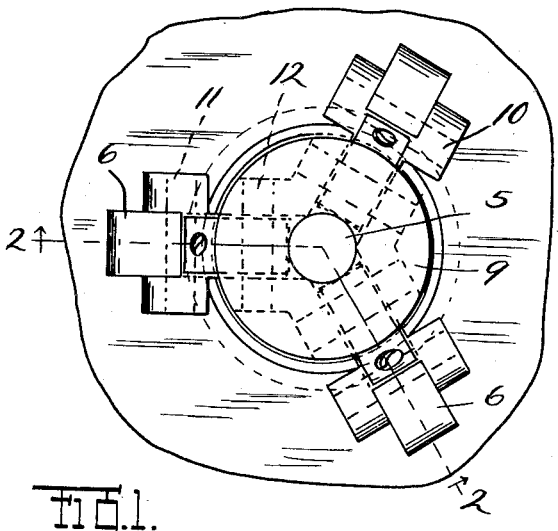
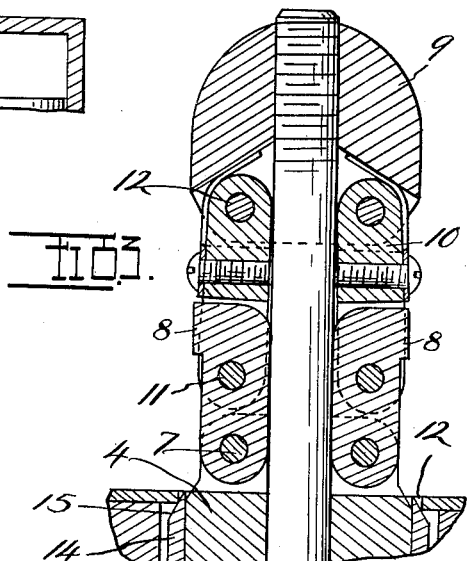
Inventor
Frank H. Lejeune
By Whittemore Hulbert & Whittemore Belknap
Attorneys May 15, 1934.   F. H. LE JEUNE   1,959,081
CHUCK
Filed March 21, 1932   2 Sheets-Sheet 2
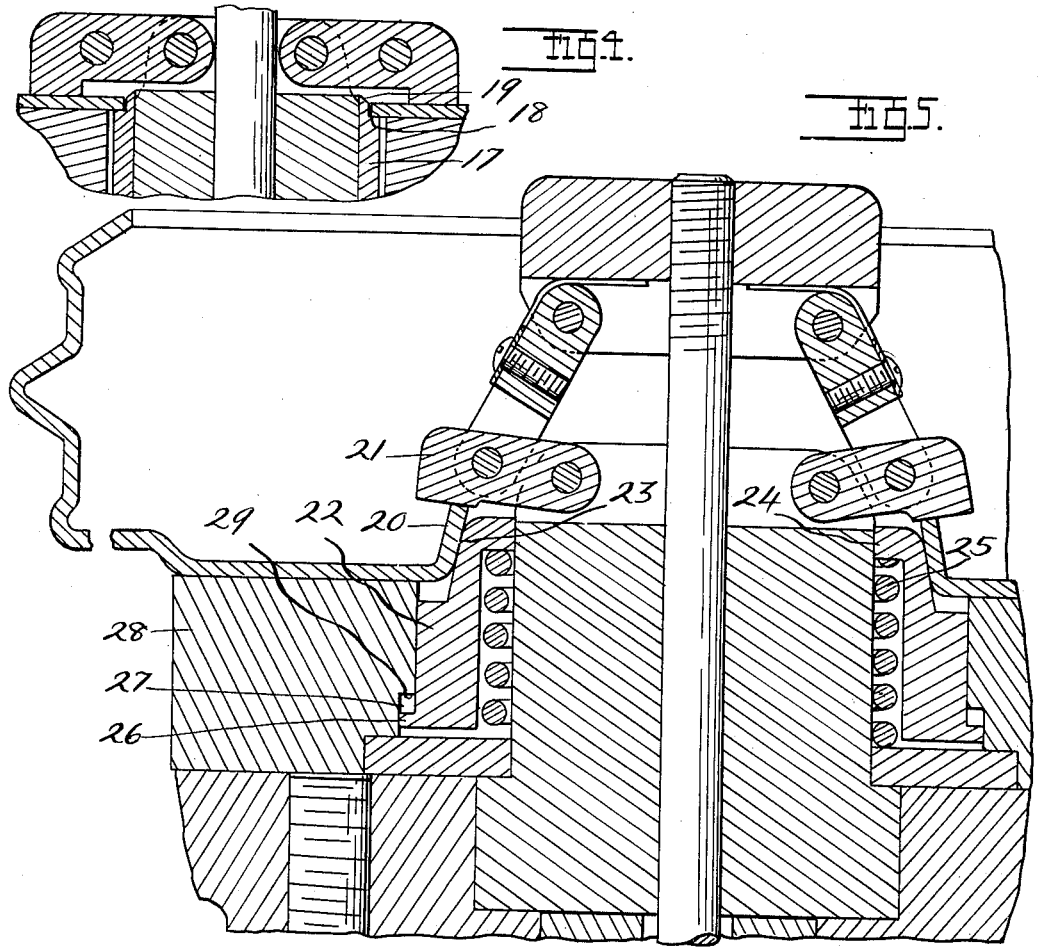
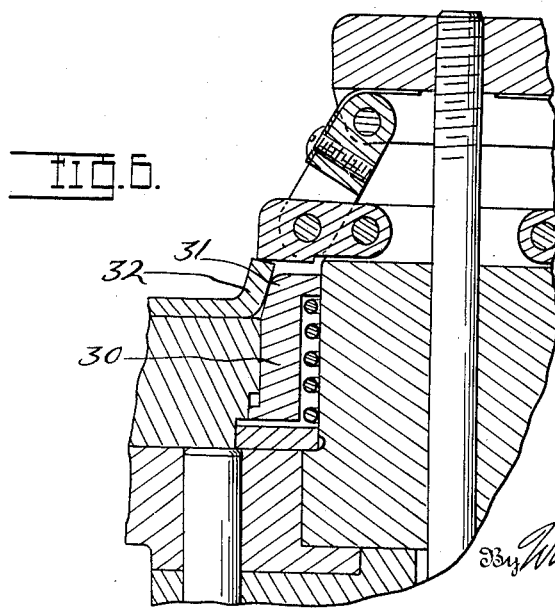
Inventor
Frank H. Lejeune
By Whittemore Hulbert Whittemore Belknap
Attorneys Patented May 15, 1934

1,959,081

UNITED STATES PATENT OFFICE 1,959,081

CHUCK

Frank H. Le Jeune, Detroit, Mich., assignor to Kelsey-Hayes Wheel Corporation, Detroit, Mich., a corporation of New York Application March 21, 1932, Serial No. 600,308

2 Claims. (Cl. 279—4)

The invention relates to chucks and has for one of its objects the provision of an improved construction of chuck which is effective in operation and simple in construction. Another object is to so construct the chuck that its part engageable with one side of the work or article may be extended or collapsed to respectively engage and clear the work or article. A further object is to provide the chuck with a pilot for locating the work or article.

These and other objects of the invention will become apparent from the following description, taken in connection with the accompanying drawings, in which Figure 1 is a plan view of a chuck illustrating an embodiment of my invention;

Figure 2 is a cross section on the line 2—2 of Figure 1;

Figure 3 is a similar view showing the chuck in inoperative or collapsed position;

Figure 4 is a detail view showing a modified construction of pilot member;

Figures 5 and 6 are views similar to Figure 2 showing other embodiments of my invention.

As illustrated in the present instance, the chuck embodying my invention is designed to clamp a brake drum in place, although it is apparent that the chuck may be used for clamping other work or articles in place. This chuck has the support 1 which comprises the face plate 2 forming an abutment for engaging the outer side of the back or web 3 of the brake drum. The support also comprises the cylindrical central member 4 which preferably extends through the face plate. 5 is a rod extending through the central member and reciprocable relative to the support. This rod is adapted to be reciprocated by any suitable means, such as a piston, connected to one end of the rod and slidable within a cylinder, which latter has manually controlled inlet and exhaust ports for the passage of a suitable medium under pressure, such as compressed air.

The chuck also has the series of jaws 6 which are angularly spaced about the rod 5 and which are pivotally connected at one end to the central member 4 by the pivots 7 which extend transversely of the radii of the rod. Each of these jaws has the projection 8 at one edge and at the end opposite the pivot 7 for engaging the inner side of the back or web of the brake drum when the jaw has been swung open to operative or extended position. 9 is a head suitably secured to an end of the rod 5 as by being threaded thereon and 10 are links pivotally connected at 11 to the jaws 6 outwardly beyond the pivot 7 and to the head at 12, the head being preferably provided with radial slots for receiving the ends of the links connected thereto.

The arrangement of the parts is such that when the jaws have been swung closed to inoperative or collapsed position they extend substantially parallel to the rod 5, as shown particularly in Figure 3, at which time they clear the edge of the central opening 13 in the back or web of the brake drum, so that this brake drum may be readily applied or removed. However, when the jaws have been swung open to operative or extended position, as shown in Figure 2, by a movement of the rod 5 in the opposite direction, they effectively clamp the back or web of the brake drum against the face plate. In this connection, it is to be noted that the axis of each pivot 11 is radially outwardly offset relative to the axes of the pivots 7 and 12 with which the pivot 11 is associated when the jaws are in collapsed position, so that they can be readily moved to extended position by the rod 5.

For the purpose of locating the back or web of the brake drum upon the support 1, the cylindrical pilot member 14 is provided sleeved upon the central member 4. This pilot member has the bevelled face 15 for engaging the inner edge of the central opening 13 in the back or web and it is yieldably urged against the edge by means of the coil spring 16 encircling the central member 4. The arrangement is such that the pilot centrally locates the brake drum and provides for variation in size of its central opening, such as expansion or contraction thereof, and particularly the latter when cooling.

In the modification shown in Figure 4, the pilot member 17 has the cylindrical seat 18 of a size to fit the inner edge of the central opening in the back or web, so that the latter is accurately positioned. This pilot member also preferably has the bevelled face 19 which is first engageable with the edge of the central opening to guide the same to the cylindrical seat.

Figure 5 discloses another modification in which the chuck is designed for use with an article, such as a brake drum, having the central tapered flange 20 surrounding its central opening. In this chuck construction the jaws 21 when they have been swung to operative or extended position engage the edge face of the flange, which in effect forms a part of the inner side of the brake drum web. Also in this construction, the pilot member 22 is formed with the reduced upper end portion 23, the outer face or periphery of which has a taper corresponding to that of the tapered flange. This pilot member has the inwardly extending annular portion or flange 24 at its upper end which is abutted by the coil spring 25. This pilot member also has the outwardly extending annular portion or flange 26 at its lower end which is slidable in the annular space 27 of the face plate 28 and is adapted to abut the face or shoulder 29 to limit the upward movement of the pilot member.

Figure 6 discloses a modification of Figure 5 in which the pilot member 30 has the rounded outer face or periphery 31 on its upper end portion, so that this rounded portion or periphery does not have an extended contact with the central tapered flange 32 of the brake drum.

What I claim as my invention is:

1. A chuck for an apertured article, comprising an abutment engageable with one side of the article, a member extending through and movable relative to said abutment, a jaw movable to extended and collapsed positions for respectively engaging the opposite side of the article and clearing the edge of the aperture in the article, and a link connected to said member and jaw for operating the latter from the former.

2. A chuck for an apertured article, comprising a support having a face plate engageable with one side of the article and a central member, a reciprocable member extending through said central member, a jaw pivotally mounted upon said central member and movable to extended and collapsed positions for respectively engaging the opposite side of the article and clearing the edge of the aperture in the article, means for operating said jaw from said reciprocable member, a pilot sleeved upon said central member and engageable with the edge of the aperture in the article, and means for yieldably holding said pilot in engagement with the article.

FRANK H. LE JEUNE.